United States Patent
Iida

(10) Patent No.: US 10,700,735 B2
(45) Date of Patent: Jun. 30, 2020

(54) TRANSMISSION DEVICE, METHOD THEREOF, AND PROGRAM

(71) Applicant: Sony Corporation, Tokyo (JP)

(72) Inventor: Sachio Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 15/561,734

(22) PCT Filed: May 2, 2016

(86) PCT No.: PCT/JP2016/063533
§ 371 (c)(1),
(2) Date: Sep. 26, 2017

(87) PCT Pub. No.: WO2016/181875
PCT Pub. Date: Nov. 17, 2016

(65) Prior Publication Data
US 2018/0109287 A1    Apr. 19, 2018

(30) Foreign Application Priority Data

May 14, 2015 (JP) .................................. 2015-098788

(51) Int. Cl.
*H04B 3/21* (2006.01)
*H04B 1/04* (2006.01)
(Continued)

(52) U.S. Cl.
CPC .................. *H04B 3/21* (2013.01); *H04B 1/04* (2013.01); *H04B 1/0475* (2013.01); *H04B 3/232* (2013.01); *H04B 3/30* (2013.01); *H04L 27/12* (2013.01); *H04L 27/18* (2013.01); *H04L 27/2647* (2013.01)

(58) Field of Classification Search
CPC .. H04L 27/20; H04L 27/2602; H04L 27/2613
See application file for complete search history.

(56) References Cited

U.S. PATENT DOCUMENTS 6,621,366 B1 *   9/2003   Gentile .................... H03C 3/40
                                                    332/103
2008/0238747 A1 * 10/2008   Moore ................ H03M 1/0609
                                                    341/144
(Continued)

FOREIGN PATENT DOCUMENTS

JP    09-505975 A    6/1997
JP    09-294145 A    11/1997
(Continued)

*Primary Examiner* — Shuwang Liu
*Assistant Examiner* — Gina M McKie
(74) *Attorney, Agent, or Firm* — Michael Best & Friedrich LLP

(57) ABSTRACT

A transmission device, method, and program for signal transmission with reduced intersymbol interference are disclosed. In one example, a mapping unit maps binary data to symbols and a generating unit generates a signal from the mapped symbols. A transmission band-limiting filter performs band limitation of the signal at a corner frequency higher than half a frequency of a symbol rate. A frequency modulating unit performs frequency modulation on a carrier wave on the basis of the band limitation and the signal.

20 Claims, 19 Drawing Sheets

(51) Int. Cl.
*H04L 27/12* (2006.01)
*H04L 27/18* (2006.01)
*H04B 3/23* (2006.01)
*H04B 3/30* (2006.01)
*H04L 27/26* (2006.01)

(56) References Cited

U.S. PATENT DOCUMENTS

| | | | | |
|---|---|---|---|---|
| 2009/0175369 A1* | 7/2009 | Atarashi | ............... | H04L 1/0003 375/260 |
| 2009/0268830 A1* | 10/2009 | Birru | .................... | H04W 16/14 375/260 |
| 2010/0130134 A1* | 5/2010 | Tamura | ................ | H04B 1/0475 455/63.1 |
| 2016/0373125 A1* | 12/2016 | Pagnanelli | ............ | H03M 3/404 |

FOREIGN PATENT DOCUMENTS

| | | |
|---|---|---|
| JP | 2004-241860 A | 8/2004 |
| JP | 2005-142870 A | 6/2005 |

\* cited by examiner

TRANSMISSION DEVICE, METHOD THEREOF, AND PROGRAM

TECHNICAL FIELD

The present technology relates to a transmission device, a method thereof, and a program, and especially relates to a transmission device, a method thereof, and a program capable of performing signal transmission with less intersymbol interference.

BACKGROUND ART

Conventionally, a linear digital modulation method such as π/2 shift binary phase shift keying (BPSK) is known, for example, as a modulation method used in a wireless communication system (for example, refer to Non-Patent Document 1).

In the linear digital modulation method, an envelope of a transmitted band signal fluctuates, so that power consumption during signal amplification increases as compared to that in a non-linear digital modulation method such as minimum shift keying (MSK). However, in the linear digital modulation method, it is known that both narrow band and highly sensitive reception may be satisfied at the same time by using a root-raised cosine filter that satisfies a Nyquist first criterion as a transmission/reception band-limiting filter.

CITATION LIST

Non-Patent Document

Non-Patent Document 1: University of Missouri, "ECE4730: Lecture #14 Digital Modulation" <http://web-.missouri.edu/~davisch/ECE_4730/Lectures/ECE4730_L14.ppt>

SUMMARY OF THE INVENTION

Problems to be Solved by the Invention

Meanwhile, in the linear digital modulation method, a linear amplifier is generally used to amplify the band signal, but when a linear amplifier is used, power efficiency is low. Therefore, in a case where signal transmission is performed using the linear digital modulation method, it is considered to non-linearly amplify the band signal by a saturation amplifier having higher power efficiency.

However, when the band signal is subjected to the non-linear amplification, a power spectrum of the band signal spreads, so that intersymbol interference occurs in a constellation and the Nyquist first criterion cannot be satisfied. Then, reception sensitivity of the band signal lowers, and robust transmission/reception of a signal becomes difficult.

The present technology is achieved in view of such a condition, and an object thereof is to make it possible to perform signal transmission with less intersymbol interference.

Solutions to Problems

A transmission device according to one aspect of the present technology is provided with a mapping unit that maps binary data to symbols of π/2 shift BPSK, a phase differentiating unit that generates a phase difference signal indicating a phase difference between the mapped symbols, a transmission band-limiting filter with a corner frequency higher than half a frequency of a symbol rate in which a roll-off factor larger than the roll-off factor of a reception band-limiting filter is set, the transmission band-limiting filter that performs band limitation of the phase difference signal, a SINC inverse function filter that performs correction on the phase difference signal, and a frequency modulating unit that performs frequency modulation on a carrier wave on the basis of the phase difference signal subjected to the band limitation and the correction.

It is possible to allow the SINC inverse function filter to perform correction for satisfying a Nyquist third criterion as the correction on the phase difference signal.

It is possible to allow the frequency modulating unit to perform the frequency modulation with a modulation index of 0.5 on the carrier wave.

The transmission device may further be provided with a saturation amplifying unit that performs saturation amplification on a band signal obtained by the frequency modulation.

The transmission band-limiting filter may be a root-raised cosine filter.

The transmission band-limiting filter may be a raised cosine filter.

It is possible to allow the SINC inverse function filter to perform the correction on the phase difference signal band-limited by the transmission band-limiting filter.

The transmission band-limiting filter and the SINC inverse function filter may be realized by one FIR filter.

A transmitting method or a program according to one aspect of the present technology includes steps of mapping binary data to symbols of π/2 shift BPSK, generating a phase difference signal indicating a phase difference between the mapped symbols, performing band limitation of the phase difference signal by a transmission band-limiting filter with a corner frequency higher than half a frequency of a symbol rate in which a roll-off factor larger than the roll-off factor of a reception band-limiting filter is set, performing correction on the phase difference signal by a SINC inverse function filter, and performing frequency modulation on a carrier wave on the basis of the phase difference signal subjected to the band limitation and the correction.

According to one aspect of the present technology, binary data is mapped to symbols of π/2 shift BPSK, a phase difference signal indicating a phase difference between the mapped symbols is generated, band limitation of the phase difference signal is performed by a transmission band-limiting filter with a corner frequency higher than half a frequency of a symbol rate in which a roll-off factor larger than the roll-off factor of a reception band-limiting filter is set, correction is performed on the phase difference signal by a SINC inverse function filter, and frequency modulation is performed on a carrier wave on the basis of the phase difference signal subjected to the band limitation and the correction.

Effects of the Invention

According to one aspect of the present technology, signal transmission with less intersymbol interference may be performed.

It should be noted that the effects are not necessarily limited to the effects herein described and may include any of the effects described in the present disclosure.

MODE FOR CARRYING OUT THE INVENTION

An embodiment to which the present technology is applied is hereinafter described with reference to the drawings.

First Embodiment

<Regarding General Wireless Communication System>

The present technology relates to a modulator of a transmission device that modulates by a modulation method using constant envelope digital modulation. For example, the present technology is applicable to a wireless terminal device requiring low power consumption and long distance transmission.

First, a general wireless communication system using a linear digital modulation method is described.

The general wireless communication system is formed of a transmission device that modulates a carrier wave on the basis of a digital signal and transmits a band signal obtained as a result, and a reception device that receives and demodulates the band signal to obtain a digital signal.

Figure 1:
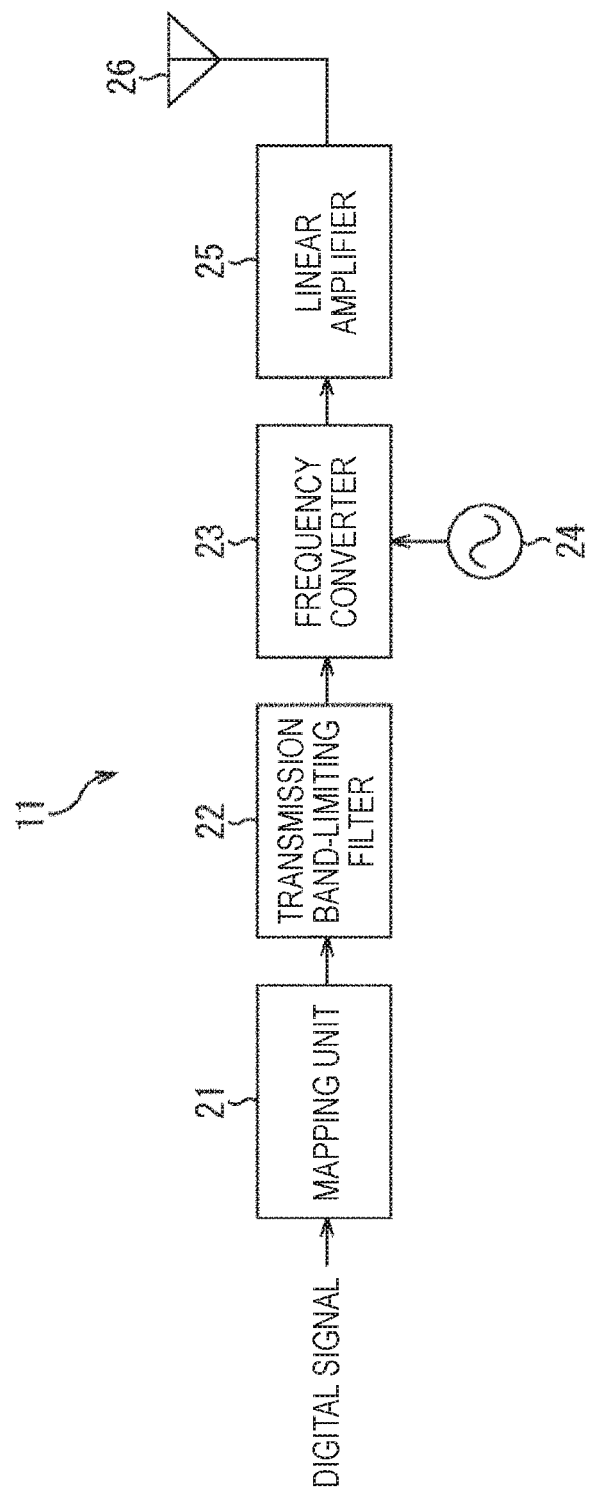
FIG. 1 is a view illustrating a configuration of a transmission device of a general wireless communication system.

The transmission device forming such wireless communication system is configured as illustrated in FIG. 1. That is, a transmission device 11 illustrated in FIG. 1 includes a mapping unit 21, a transmission band-limiting filter 22, a frequency converter 23, a local oscillator 24, a linear amplifier 25, and an antenna 26.

The mapping unit 21 maps a transmission bit string of the digital signal to be transmitted to modulation symbols and outputs a mapping signal corresponding to a mapping value to the transmission band-limiting filter 22.

The transmission band-limiting filter 22 formed of, for example, a root Nyquist filter performs band limitation to limit a frequency occupied bandwidth on the mapping signal supplied from the mapping unit 21 and outputs a baseband signal obtained as a result to the frequency converter 23.

The frequency converter 23 multiplies the baseband signal output from the transmission band-limiting filter 22 by a carrier wave of a predetermined frequency oscillated by the local oscillator 24 to perform frequency conversion and outputs the band signal obtained as a result to the linear amplifier 25. The linear amplifier 25 linearly amplifies the band signal output from the frequency converter 23 and transmits the same from the antenna 26.

Figure 2:
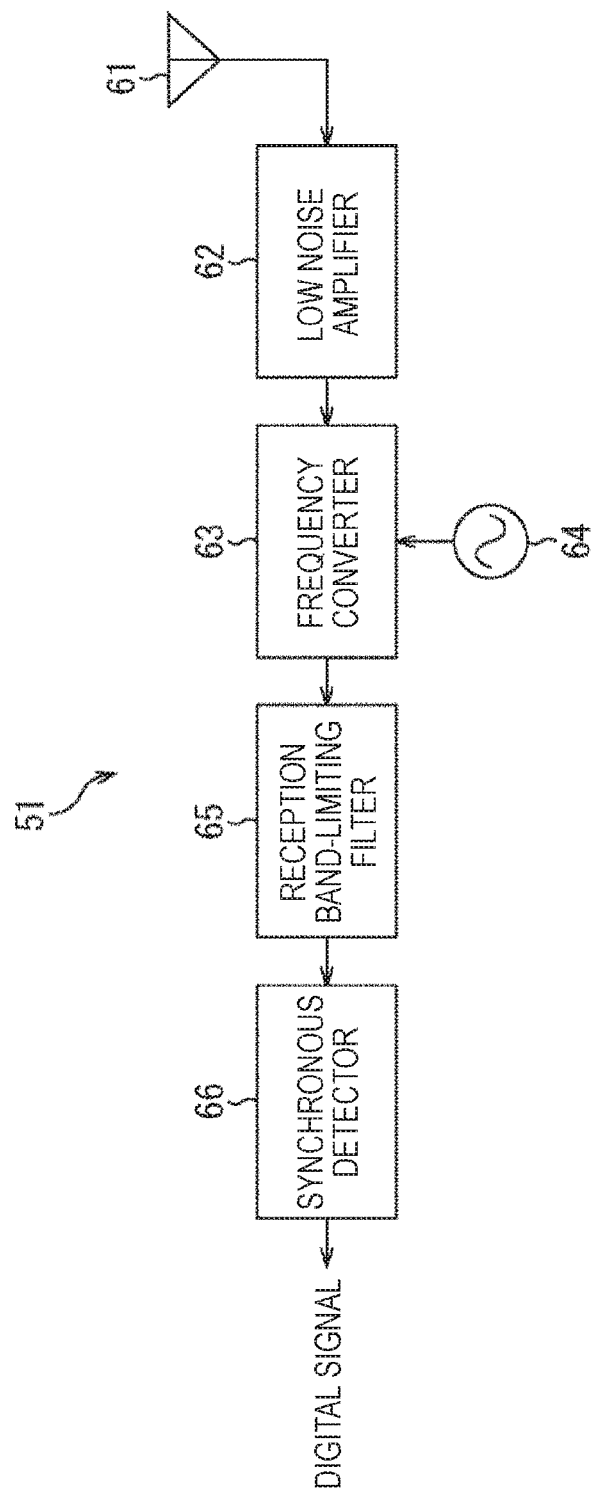
FIG. 2 is a view illustrating a configuration of a reception device of the general wireless communication system.

Also, the reception device that receives the band signal transmitted by the transmission device 11 is configured as illustrated in FIG. 2. That is, a reception device 51 illustrated in FIG. 2 includes an antenna 61, a low noise amplifier 62, a frequency converter 63, a local oscillator 64, a reception band-limiting filter 65, and a synchronous detector 66.

The low noise amplifier 62 amplifies the band signal received by the antenna 61 and outputs the same to the frequency converter 63. The frequency converter 63 multiplies the band signal output from the low noise amplifier 62 by a carrier wave of a predetermined frequency oscillated by the local oscillator 64 to convert the band signal to a baseband signal and outputs the same to the reception band-limiting filter 65.

The reception band-limiting filter 65 formed of a root Nyquist filter having the same characteristic as that of the transmission band-limiting filter 22 on the transmission side, for example, removes noise outside a reception band and disturbance waves from the baseband signal output from the frequency converter 63 and outputs the same to the synchronous detector 66.

The synchronous detector 66 performs coherent detection on the baseband signal output from the reception band-limiting filter 65 to demodulate the digital signal.

<Regarding Characteristic of Linear Digital Modulation Method>

A characteristic of the linear digital modulation method is herein described with π/2 shift BPSK as an example.

Figure 3:
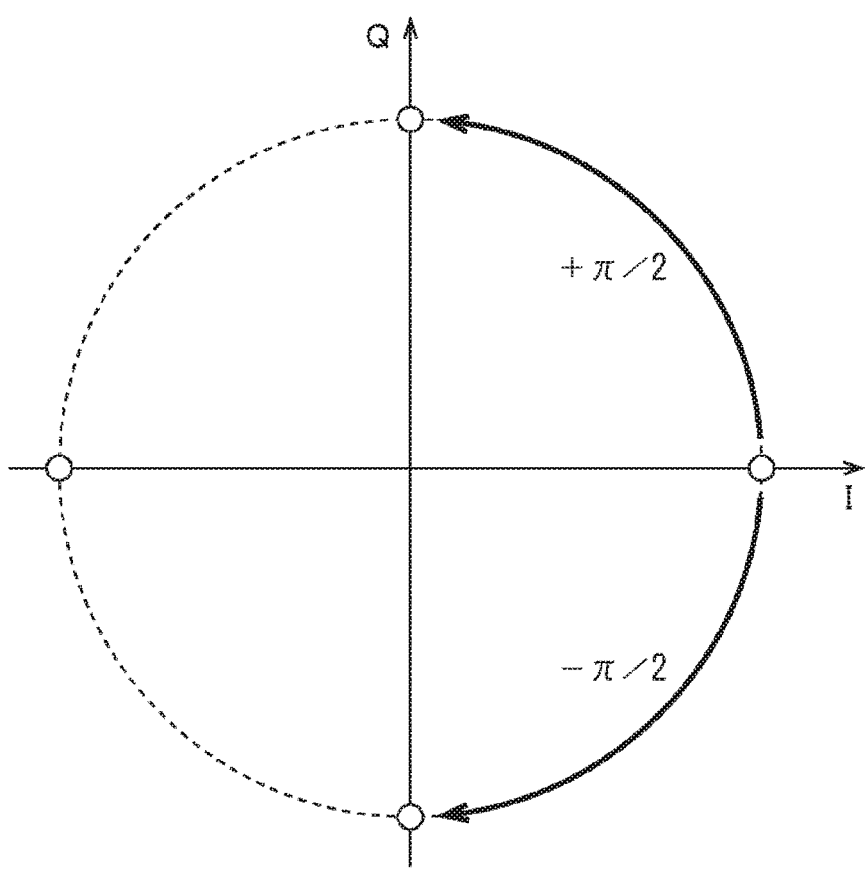
FIG. 3 is a view illustrating a constellation of π/2 shift BPSK.

FIG. 3 is a constellation diagram illustrating mapping of π/2 shift BPSK. That is, in FIG. 3, the abscissa axis represents an I component (in-phase component) and the ordinate axis represents a Q component (orthogonal component). Also, in FIG. 3, circles represent symbol points.

Since π/2 shift BPSK is BPSK in which each symbol is phase-shifted in a counterclockwise direction by π/2, each symbol of the transmission bit string of the digital signal is alternately mapped to the I component and the Q component to make the constellation of four points as illustrated in FIG. 3. Therefore, a phase of a next symbol is shifted to either +π/2 or −π/2 on the basis of a current symbol position.

For example, in a case where the current symbol position is in a positive position on the I axis, a next symbol position is in a positive or negative position on the Q axis depending on a value of the transmission bit.

Such π/2 shift BPSK seems to be a constant envelope when looking at only the phase shift of the symbol. However, in a case where a root-raised cosine filter with a roll-off factor α=0.5 is used, for example, as the transmission band-limiting filter 22, the envelope fluctuates as illustrated in FIG. 4 in a constellation of the band signal.

Figure 4:
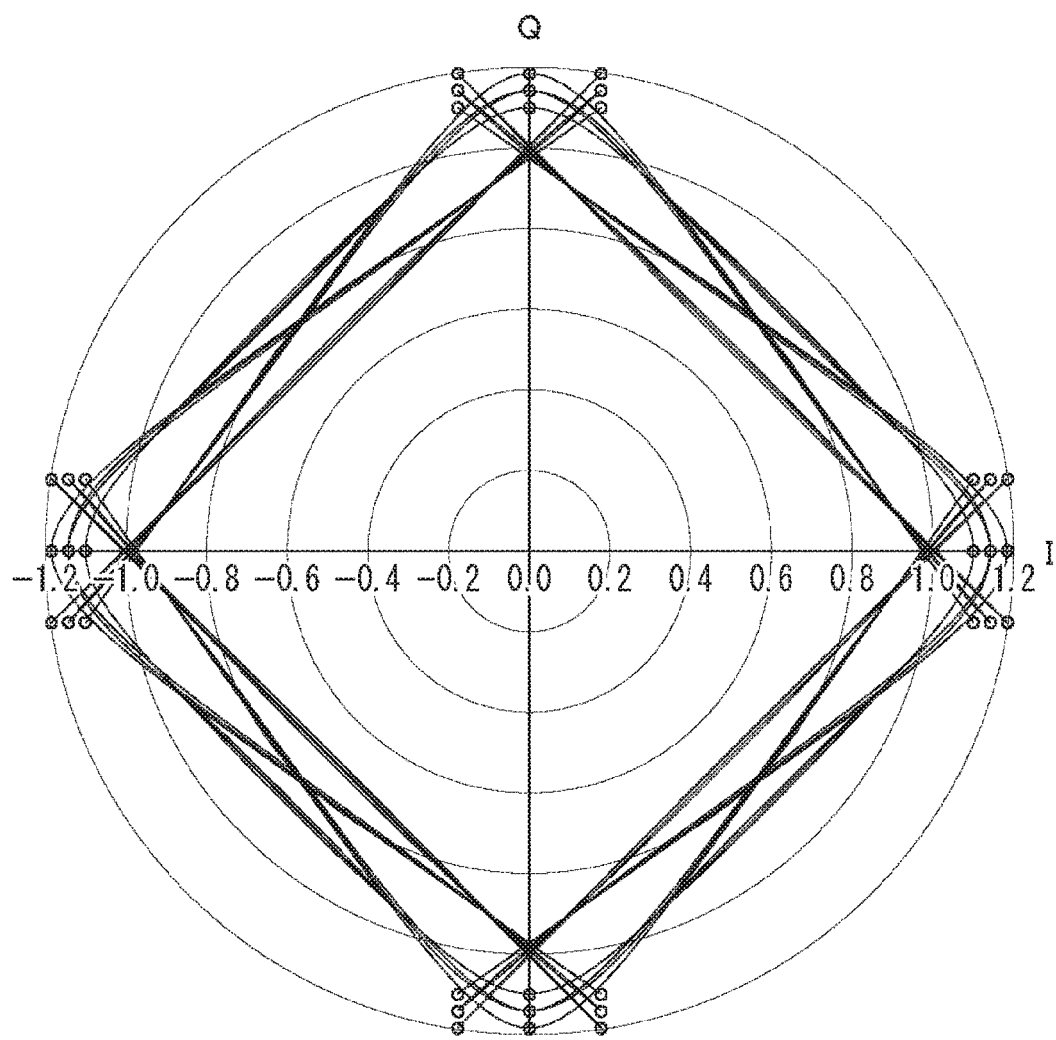
FIG. 4 is a view illustrating a constellation of a band signal.

It should be noted that, in FIG. 4, the abscissa axis represents the I component and the ordinate axis represents the Q component. Also, circles in FIG. 4 represent the symbol points. In this example, it is understood that a radius of the envelope is not constant, that is, the envelope of the band signal changes.

Figure 5:
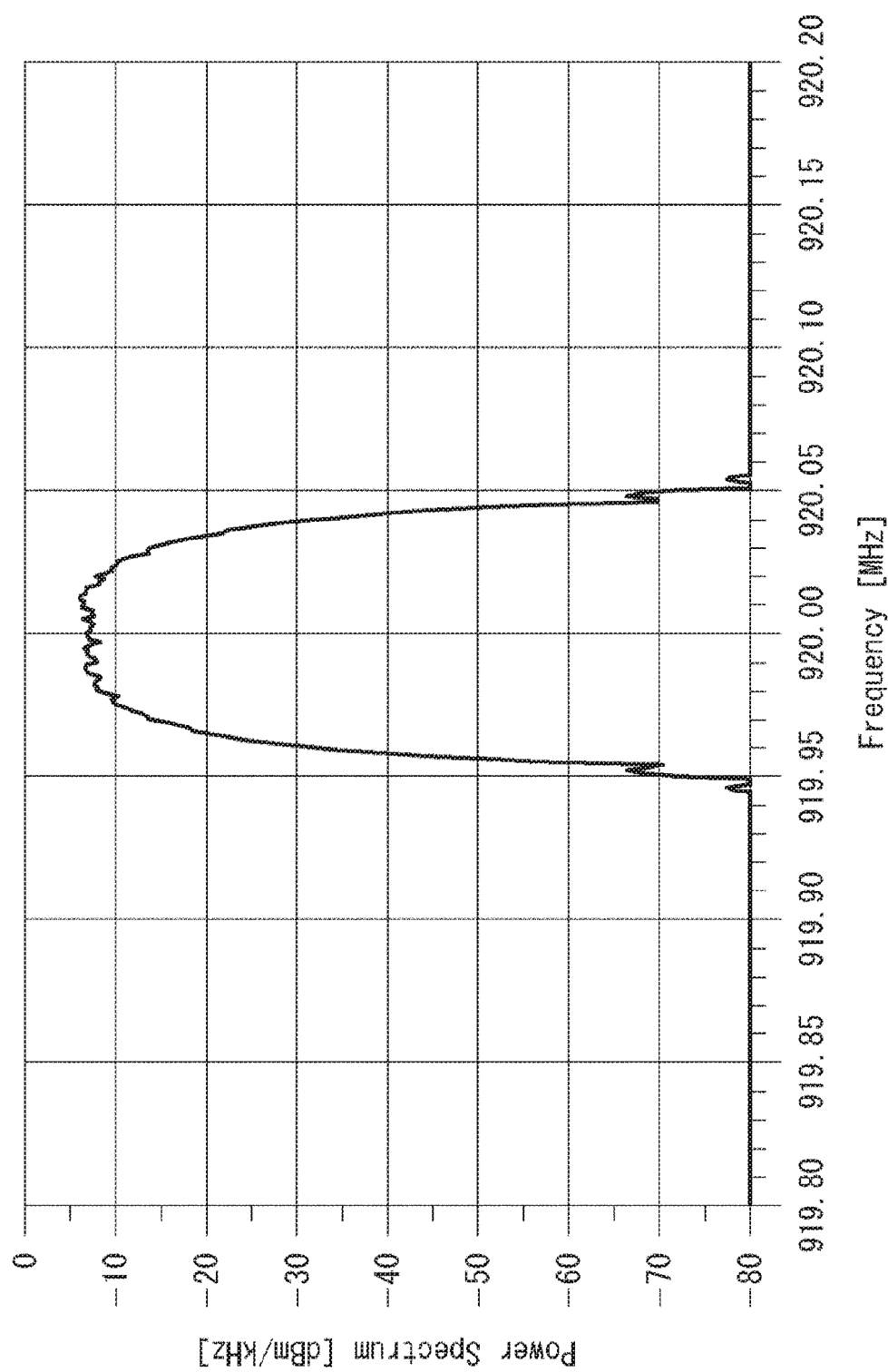
FIG. 5 is a view illustrating a power spectrum of a band signal.

Also, in a case where the root-raised cosine filter with the roll-off factor α=0.5 is used as the transmission band-limiting filter 22, a power spectrum of the band signal is as illustrated in FIG. 5. It should be noted that, in FIG. 5, the abscissa axis represents a frequency and the ordinate axis represents the power spectrum of each frequency.

Since π/2 shift BPSK is the linear digital modulation method, it is understood that a frequency characteristic of the transmission band-limiting filter 22 is directly reflected in the spectrum of the band signal and a narrow band characteristic is obtained as illustrated in FIG. 5.

Figure 6:
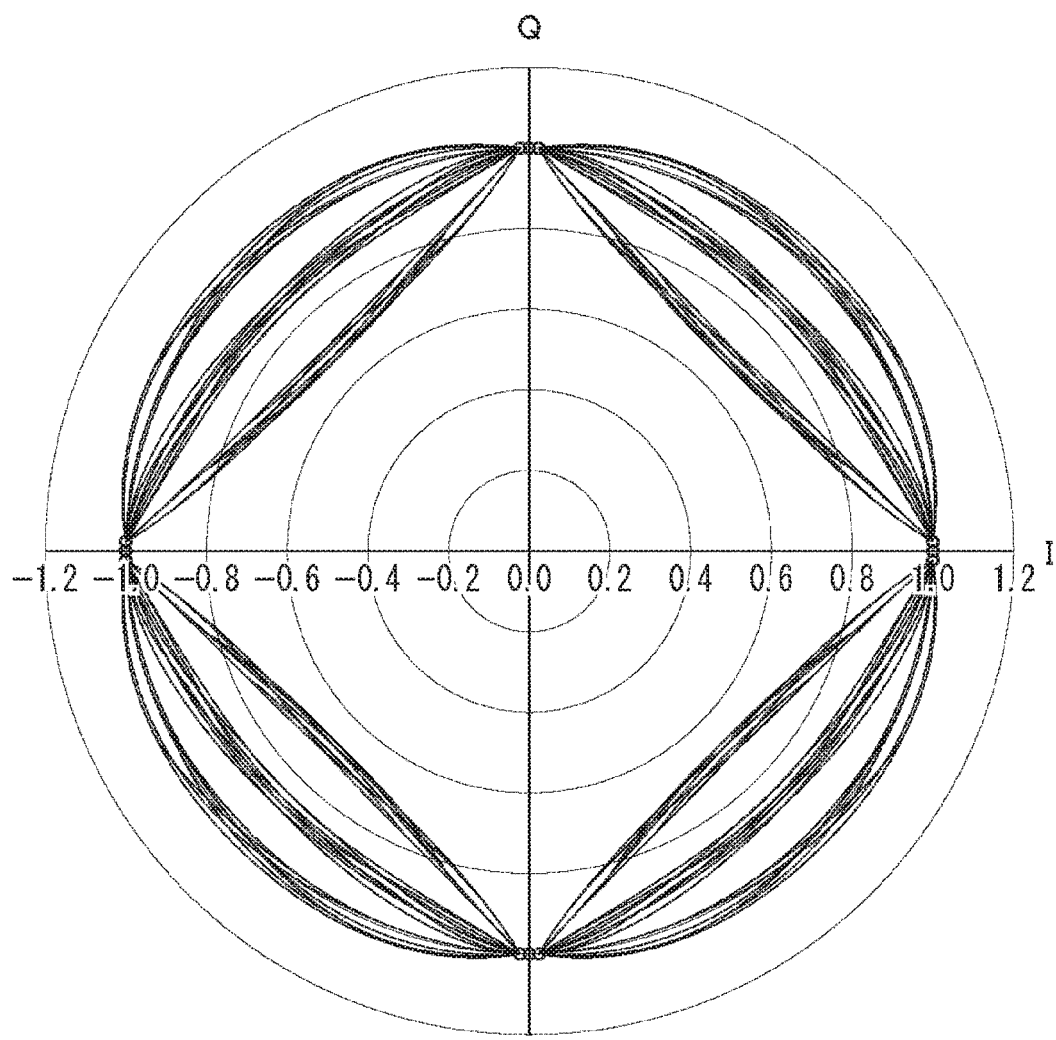
FIG. 6 is a view illustrating a constellation of a baseband signal on a reception side.

When such band signal is received by the reception device 51 and the baseband signal obtained from the band signal passes through the reception band-limiting filter 65, a constellation of the baseband signal is as illustrated in FIG. 6, for example. It should be noted that, in FIG. 6, the abscissa axis represents the I component and the ordinate axis represents the Q component. Also, circles in FIG. 6 represent the symbol points.

In this example, it is understood that a Nyquist first criterion is satisfied by passing through the root Nyquist filter twice in transmission and reception and since there is no intersymbol interference, the constellation converges to one point. Herein, satisfying the Nyquist first criterion means that an impulse response h(t) of a system in which no intersymbol interference occurs realizes zero crossing at symbol time intervals except at time t=0.

Meanwhile, in the transmission device 11, the linear amplification is performed by the linear amplifier 25 to amplify the band signal, but power efficiency is low in the linear amplification. Therefore, it is considered to perform non-linear amplification (saturation amplification) on the band signal by using a saturation amplifier with higher power efficiency in place of the linear amplifier 25.

Figure 7:
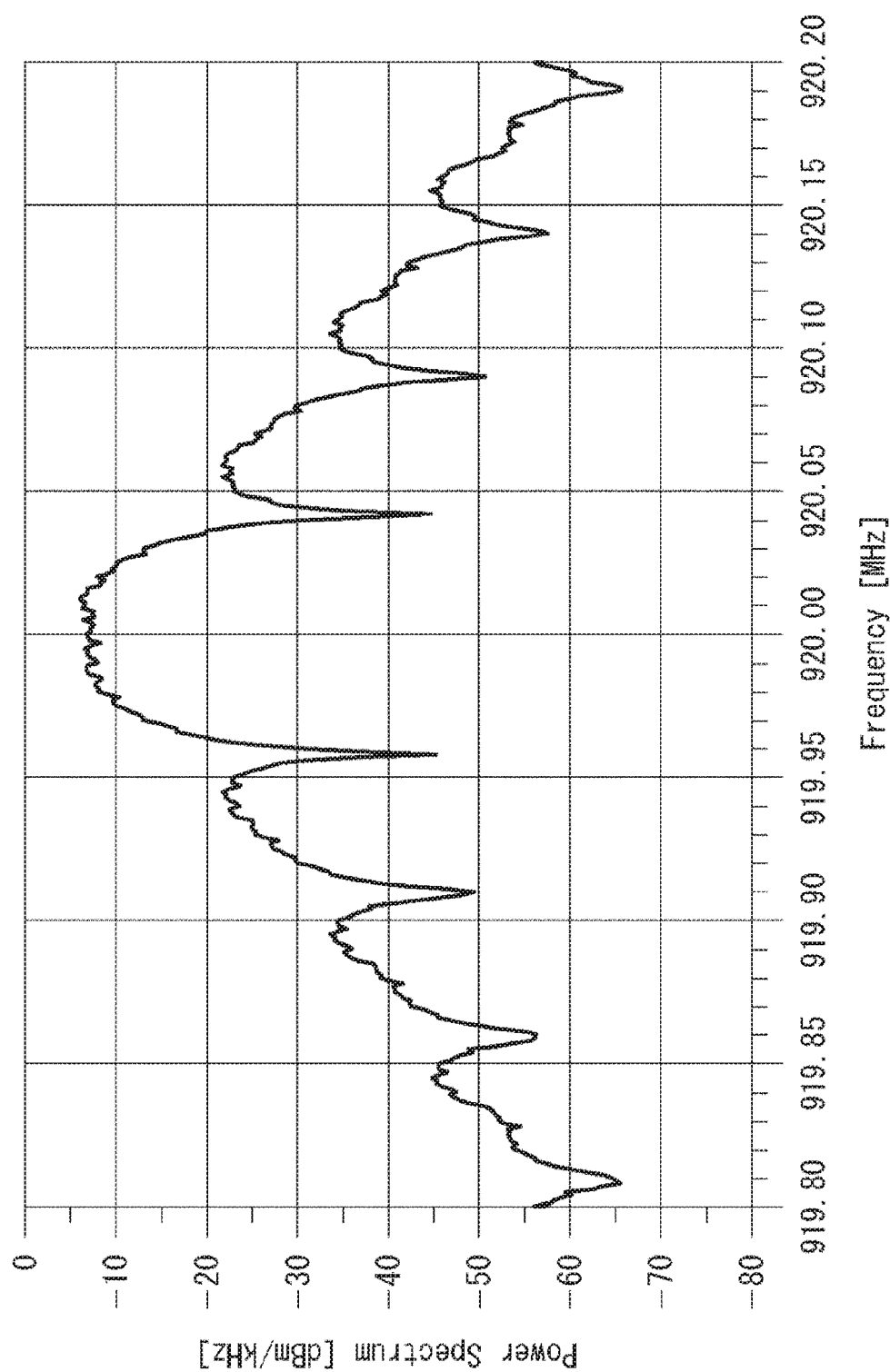
FIG. 7 is a view illustrating a power spectrum of the band signal.

In such a case, the power spectrum of the band signal non-linearly amplified by the saturation amplifier is, for example, as illustrated in FIG. 7. It should be noted that, in FIG. 7, the abscissa axis represents the frequency and the ordinate axis represents the power spectrum of each frequency.

In this example, spectral regrowth occurs due to non-linear distortion of the saturation amplifier and the spectrum of the band signal spreads, so that the narrow band characteristic of the linear digital modulation method is lost. That is, if the amplitude of the band signal is non-linearly amplified, a new frequency component which is not present before appears in the amplified band signal, so that the spectrum spreads.

Figure 8:
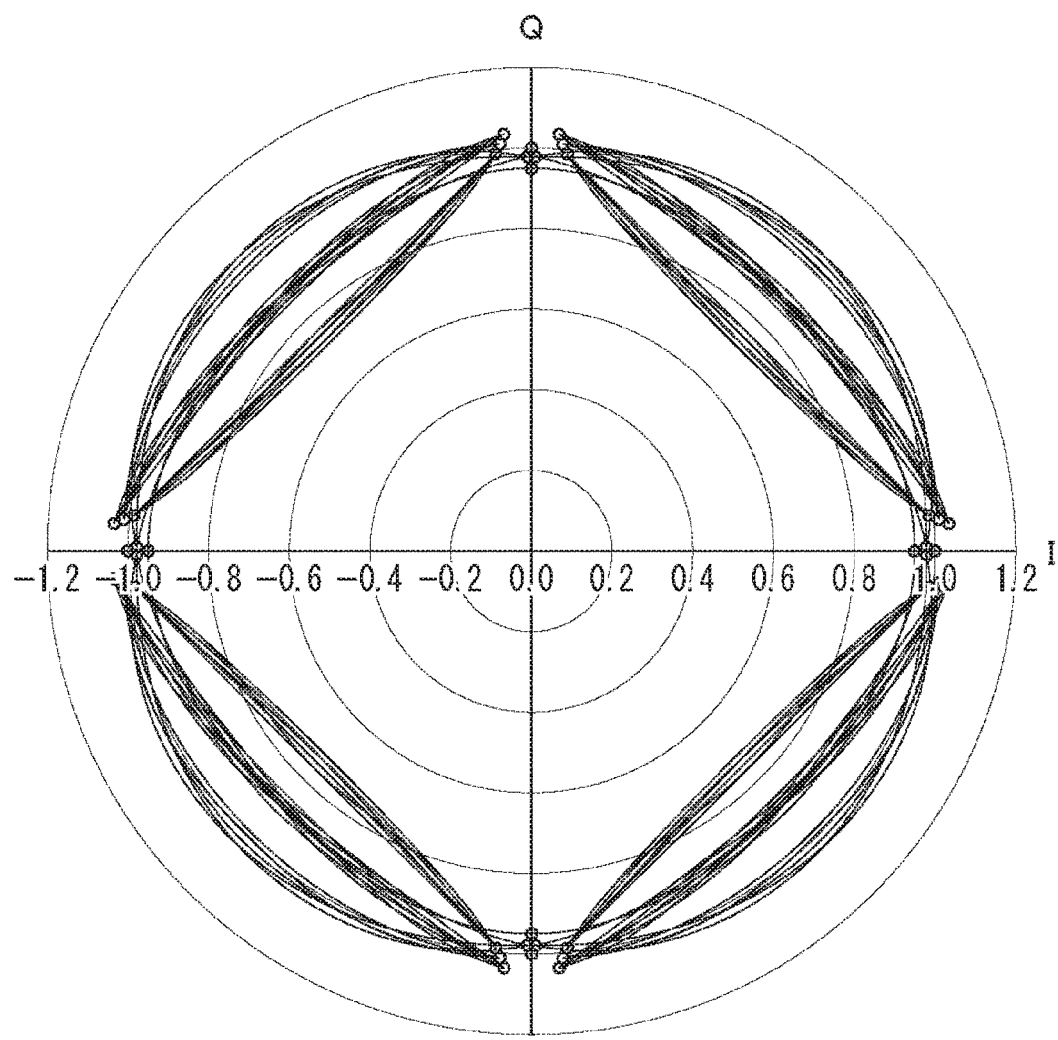
FIG. 8 is a view illustrating a constellation of the baseband signal on the reception side.

Therefore, in the constellation of the baseband signal that passes through the reception band-limiting filter 65, the symbol points spread as illustrated in FIG. 8, for example. It should be noted that, in FIG. 8, the abscissa axis represents the I component and the ordinate axis represents the Q component. Also, circles in FIG. 8 represent the symbol points.

In this example, the intersymbol interference occurs due to the non-linear distortion of the band signal by the saturation amplifier and the convergence of the constellation is lost. In such a case, the Nyquist first criterion is not satisfied.

In this manner, in the linear digital modulation method, it is possible to generate the band signal with a limited frequency occupied bandwidth by using the root Nyquist filter as the transmission band-limiting filter. Also, by using the similar root Nyquist filter also as the reception band-limiting filter, it is possible to remove the noise outside the reception band and the disturbance waves from the baseband signal, and to perform signal transmission without intersymbol interference while satisfying the Nyquist first criterion.

However, in the linear digital modulation method, a linear amplifier with lower power efficiency than that of the saturation amplifier is required, so that the power consumption increases. Furthermore, if the characteristic of the amplifier has non-linearity, the spectral regrowth occurs in the power spectrum of the band signal and the intersymbol interference occurs in the constellation, so that the Nyquist first criterion cannot be satisfied.

Therefore, in the present technology, the spread of the power spectrum of the band signal is reduced as compared with a case where the band signal is subjected to the saturation amplification by the linear digital modulation method even with the constant envelope which may use the saturation amplifier with high power efficiency.

Furthermore, the present technology may realize constant envelope digital modulation capable of removing the noise outside the reception band and the disturbance waves and performing the signal transmission with less intersymbol interference while satisfying the Nyquist first criterion by using the root Nyquist filter as the reception band-limiting filter as in the linear digital modulation method.

<Configuration Example of Transmission Device>

Next, a specific embodiment to which the present technology is applied is described.

Figure 9:
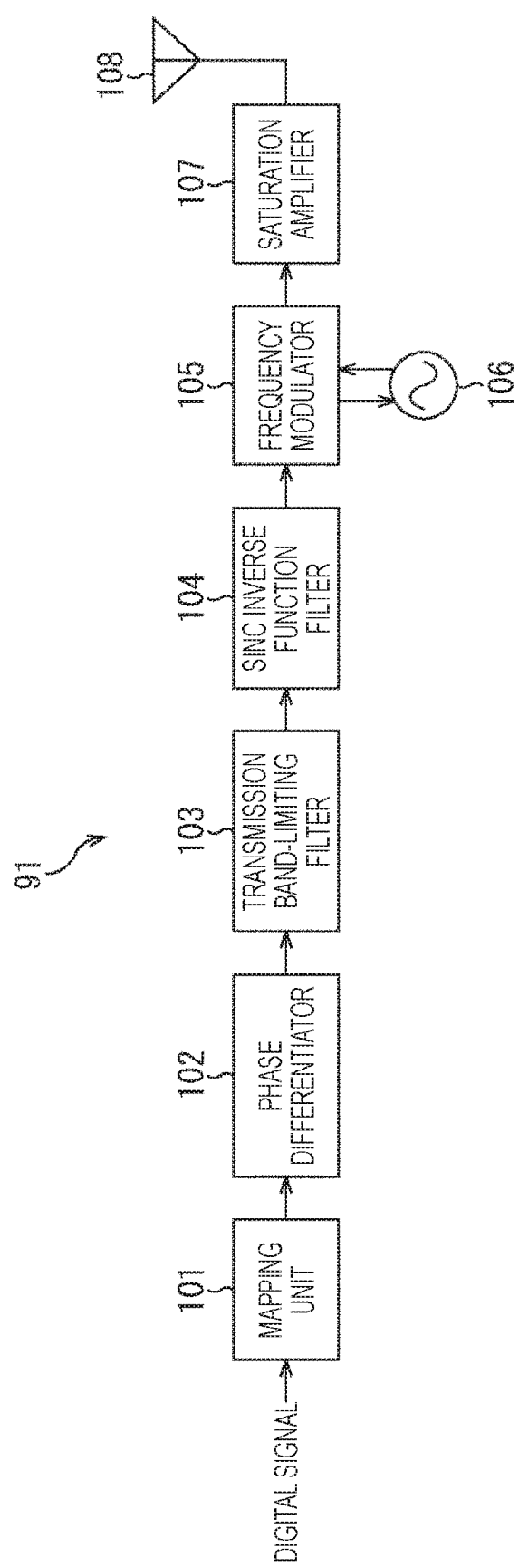
FIG. 9 is a view illustrating a configuration of the transmission device to which the present technology is applied.

FIG. 9 is a view illustrating a configuration example of a transmission device to which the present technology is applied.

A transmission device 91 illustrated in FIG. 9 includes a mapping unit 101, a phase differentiator 102, a transmission band-limiting filter 103, a SINC inverse function filter 104, a frequency modulator 105, a voltage controlled oscillator 106, a saturation amplifier 107, and an antenna 108.

A transmission bit string, that is, binary data of a digital signal to be transmitted is supplied to the mapping unit 101. The mapping unit 101 maps each bit of the supplied transmission bit string to a symbol of π/2 shift BPSK and outputs a mapping signal corresponding to a mapping value to the phase differentiator 102.

The phase differentiator 102 outputs a phase difference signal corresponding to a phase difference between the symbols of the mapping signals output from the mapping unit 101 to the transmission band-limiting filter 103 for each symbol rate. Herein, the phase difference signal is a voltage signal indicating the phase difference between the mapping signals adjacent in a time direction, that is, between the symbols to which the transmission bits are mapped adjacent in the time direction, and the phase difference between the symbols indicated by the phase difference signal is either +π/2 or −π/2.

The transmission band-limiting filter 103 is a filter having a root-raised cosine frequency characteristic or a raised cosine frequency characteristic with a corner frequency higher than half a frequency of the symbol rate of the mapping signal (phase difference signal) in which a roll-off factor larger than that of the reception band-limiting filter is set.

The transmission band-limiting filter 103 performs band limitation by filtering the phase difference signal output from the phase differentiator 102 and outputs the band-limited phase difference signal to the SINC inverse function filter 104.

The SINC inverse function filter 104 performs correction for satisfying a Nyquist third criterion on the phase difference signal output from the transmission band-limiting filter 103 and outputs the same to the frequency modulator 105.

Herein, satisfying the Nyquist third criterion means that, when an impulse response of a system at time t is set to h(t) and in a case where the impulse response h(t) is integrated for each symbol section, an integral value becomes 0 in other symbol sections except for one symbol section around t=0.

It should be noted that satisfying the Nyquist third criterion by the filtering by the SINC inverse function filter is described, for example, in "S. Pasupathy, "Nyquist's Third Criterion," Proceedings of the IEEE, Vol. 62, No. 6, June 1974, pp. 860-861.", and the like.

The frequency modulator 105 controls the voltage controlled oscillator 106 on the basis of the phase difference signal output from the SINC inverse function filter 104 to apply frequency modulation with a modulation index h=0.5 to a carrier wave of a predetermined frequency, and outputs a resulting band signal to the saturation amplifier 107.

On the basis of the phase difference signal supplied from the frequency modulator 105, the voltage controlled oscillator 106 applies the frequency modulation with the modulation index h=0.5 to the carrier wave of a predetermined frequency oscillated by itself and outputs the resulting band signal to the frequency modulator 105. Performing such frequency modulation is equivalent to integrating a phase.

In the voltage controlled oscillator 106, the frequency modulation is performed with the modulation index h=0.5, so that a phase change amount between the symbols in the carrier wave is $+\pi/2$ or $-\pi/2$.

By performing the frequency modulation on the basis of the phase difference signal in this manner, the band signal having a constant envelope, that is, constant amplitude may be obtained. Therefore, even if the band signal is subjected to non-linear amplification (saturation amplification), spectral regrowth does not occur in a power spectrum of the amplified band signal and occurrence of intersymbol interference may be inhibited.

The saturation amplifier 107 performs the non-linear amplification (saturation amplification) on the band signal output from the frequency modulator 105 and transmits the same from the antenna 108.

<Regarding Transmission Band-Limiting Filter>

Subsequently, the transmission band-limiting filter 103 is described.

The transmission band-limiting filter 103 is a root-raised cosine filter or a raised cosine filter with a corner frequency higher than half a frequency of the symbol rate in which a roll-off factor larger than that of the reception band-limiting filter is set.

For example, in the transmission band-limiting filter 103, assuming that the symbol rate is fsym and the corner frequency is fc, a relationship between the symbol rate fsym and the corner frequency fc is as represented by following expression (1)

[Mathematical Expression 1]

$$fc > \frac{fsym}{2} \qquad (1)$$

Also, when the roll-off factor of the transmission band-limiting filter 103 is α1 and the roll-off factor of the reception band-limiting filter is α2, a relationship of these roll-off factors is as represented by following expression (2)

[Mathematical Expression 2]

$$\alpha1 > \alpha2 \qquad (2)$$

Herein, the reception band-limiting filter is a filter corresponding to the transmission band-limiting filter 103 in the reception device that receives and demodulates the band signal transmitted from the transmission device 91. For example, in a case where the reception device 51 receives the band signal transmitted from the transmission device 91, the reception band-limiting filter 65 is a filter corresponding to the transmission band-limiting filter 103.

According to the experiments by the present applicant, it is confirmed that the signal transmission with less intersymbol interference may be realized by giving the characteristics represented by expressions (1) and (2) to the transmission band-limiting filter 103.

Also, in a case where the transmission band-limiting filter 103 and the reception band-limiting filter are filters having the root-raised cosine frequency characteristic, that is, the root-raised cosine filters, a frequency characteristic $H_{RRC}(f)$ of the root-raised cosine filters is represented by following expression (3).

[Mathematical Expression 3]

$$H_{RRC}(f) = \begin{cases} 1 & \ldots\ 0 \le |f| < (1-\alpha) \cdot fc \\ \cos\left[\frac{\pi}{4 \cdot \alpha \cdot fc}\{|f| - (1-\alpha) \cdot fc\}\right] & \ldots\ (1-\alpha) \cdot fc \le |f| < (1+\alpha) \cdot fc \\ 0 & \ldots\ |f| \ge (1+\alpha) \cdot fc \end{cases} \qquad (3)$$

Similarly, in a case where the transmission band-limiting filter 103 and the reception band-limiting filter are filters having the raised cosine frequency characteristic, that is, the raised cosine filters, a frequency characteristic $H_{RC}(f)$ of the raised cosine filters is represented by following expression (4).

[Mathematical Expression 4]

$$H_{RC}(f) = \begin{cases} 1 & \ldots\ 0 \le |f| < (1-\alpha) \cdot fc \\ \cos^2\left[\frac{\pi}{4 \cdot \alpha \cdot fc}\{|f| - (1-\alpha) \cdot fc\}\right] & \ldots\ (1-\alpha) \cdot fc \le |f| < (1+\alpha) \cdot fc \\ 0 & \ldots\ |f| \ge (1+\alpha) \cdot fc \end{cases} \qquad (4)$$

It should be noted that, in expressions (3) and (4), f represents the frequency and fc represents the corner frequency. Also, α represents the roll-off factor, that is, the roll-off factor α1 or the roll-off factor α2 described above.

Furthermore, a frequency characteristic $H_{InvSINC}(f)$ of the SINC inverse function filter 104 is represented by following expression (5).

[Mathematical Expression 5]

$$H_{InvSINC}(f) = \begin{cases} 1 & \dots f = 0 \vee |f| \geq fsym \\ \left| \frac{(\pi \cdot |f|/fsym)}{\sin(\pi \cdot |f|/fsym)} \right| & \dots 0 < |f| < fsym \end{cases} \quad (5)$$

It should be noted that, in expression (5), f represents the frequency and fsym represents the symbol rate.

In the phase differentiator 102, differential processing is performed for each symbol, and the phase integration is performed in the above-described voltage controlled oscillator 106, so that this is equivalent to convolution of a rectangular function with a pulse width of one symbol. When this processing is viewed in a frequency domain, filtering of the SINC characteristic is performed. Therefore, in the SINC inverse function filter 104, the filtering by the SINC inverse function filter is performed in order to correct an unintended SINC characteristic.

Also, it is herein configured such that the filtering is performed by the SINC inverse function filter 104 after the filtering by the transmission band-limiting filter 103 is performed; however, it is also possible to perform the filtering by the transmission band-limiting filter 103 after the filtering by the SINC inverse function filter 104 is performed.

Furthermore, the two filters of the transmission band-limiting filter 103 and the SINC inverse function filter 104 may be realized by one finite impulse response (FIR) filter to be implemented.

Figure 10:
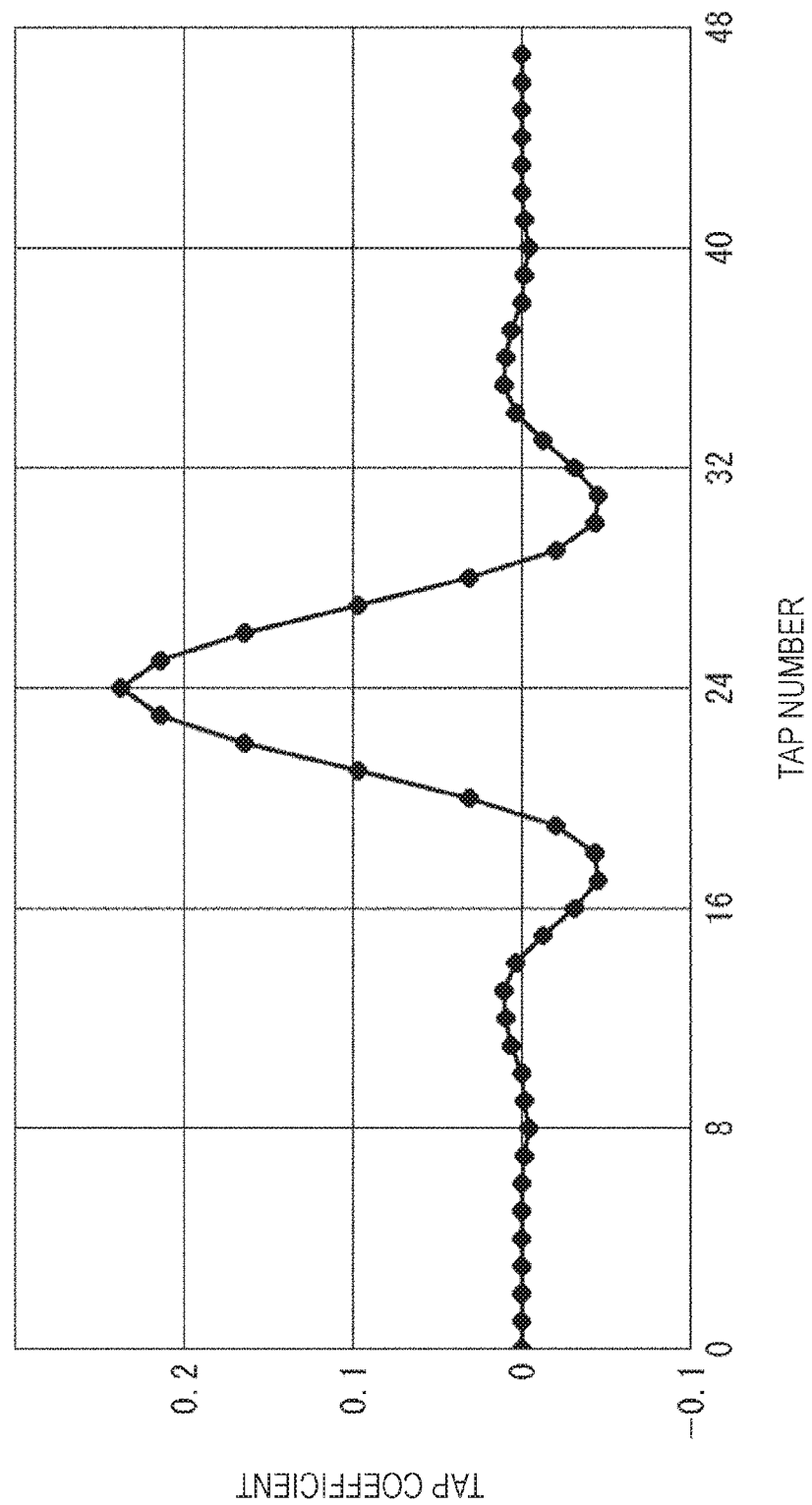
FIG. 10 is a view illustrating an example of a FIR filter.

In such a case, the FIR filter realizing the transmission band-limiting filter 103 and the SINC inverse function filter 104 is as illustrated in FIG. 10, for example. It should be noted that, in FIG. 10, the abscissa axis represents a tap number of a tap forming the FIR filter, and the ordinate axis represents a coefficient of each tap, that is, a tap coefficient.

The FIR filter illustrated in FIG. 10 is the FIR filter with the number of oversamples of eight obtained by combining the root-raised cosine filter with the corner frequency fc=1.08×fsym/2 and the roll-off factor α1=0.65 and the SINC inverse function filter.

In this case, as for the reception band-limiting filter on the reception side of the band signal, for example, the roll-off factor is α2=0.5 or the like.

Figure 11:
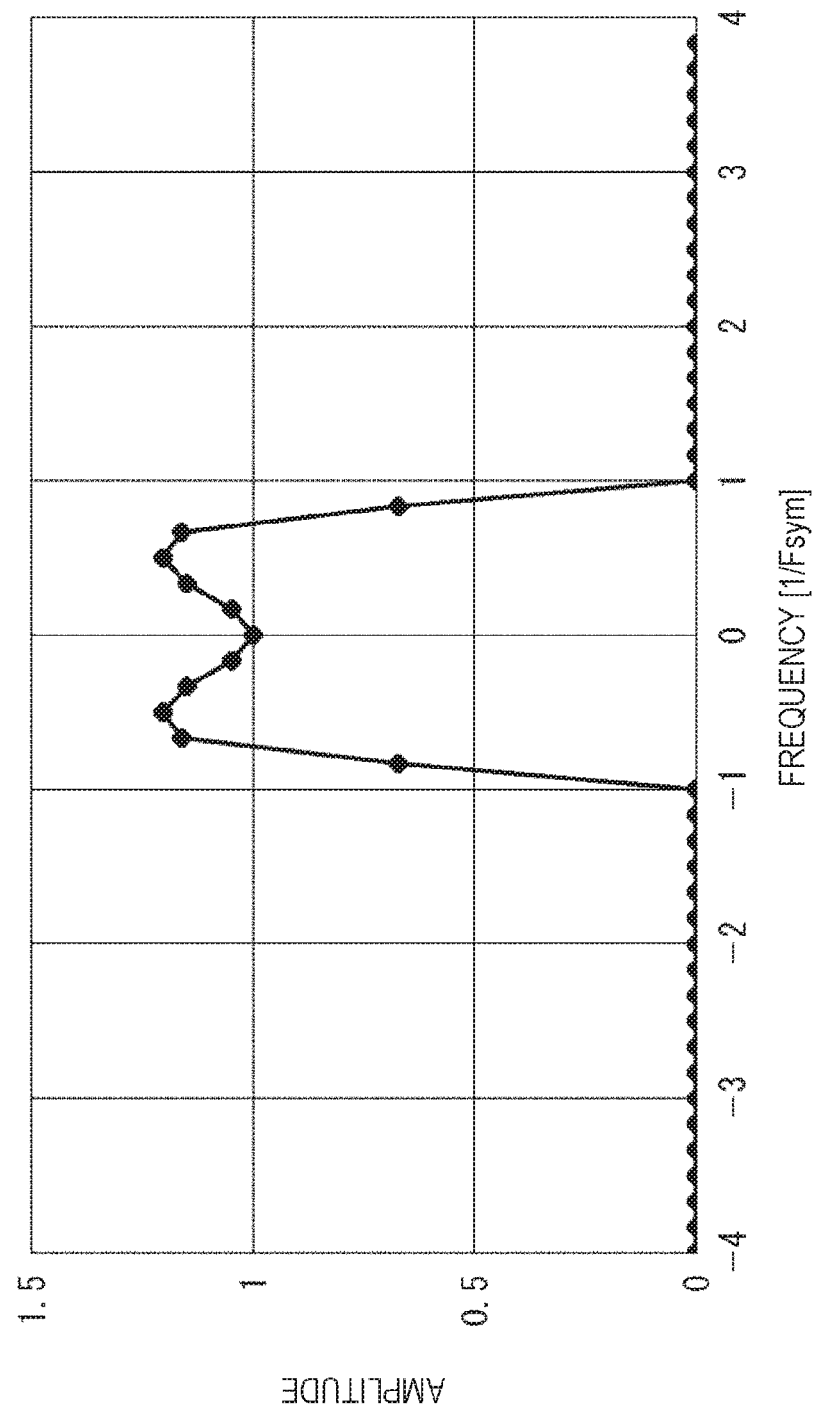
FIG. 11 is a view illustrating an amplitude characteristic of the FIR filter.

An amplitude characteristic of such FIR filter illustrated in FIG. 10 is as illustrated in FIG. 11. It should be noted that, in FIG. 11, the abscissa axis represents the frequency and the ordinate axis represents the amplitude.

According to the experiments by the present applicant, it is confirmed that the signal transmission with less intersymbol interference may be realized by using the FIR filter having such characteristic.

Figure 12:
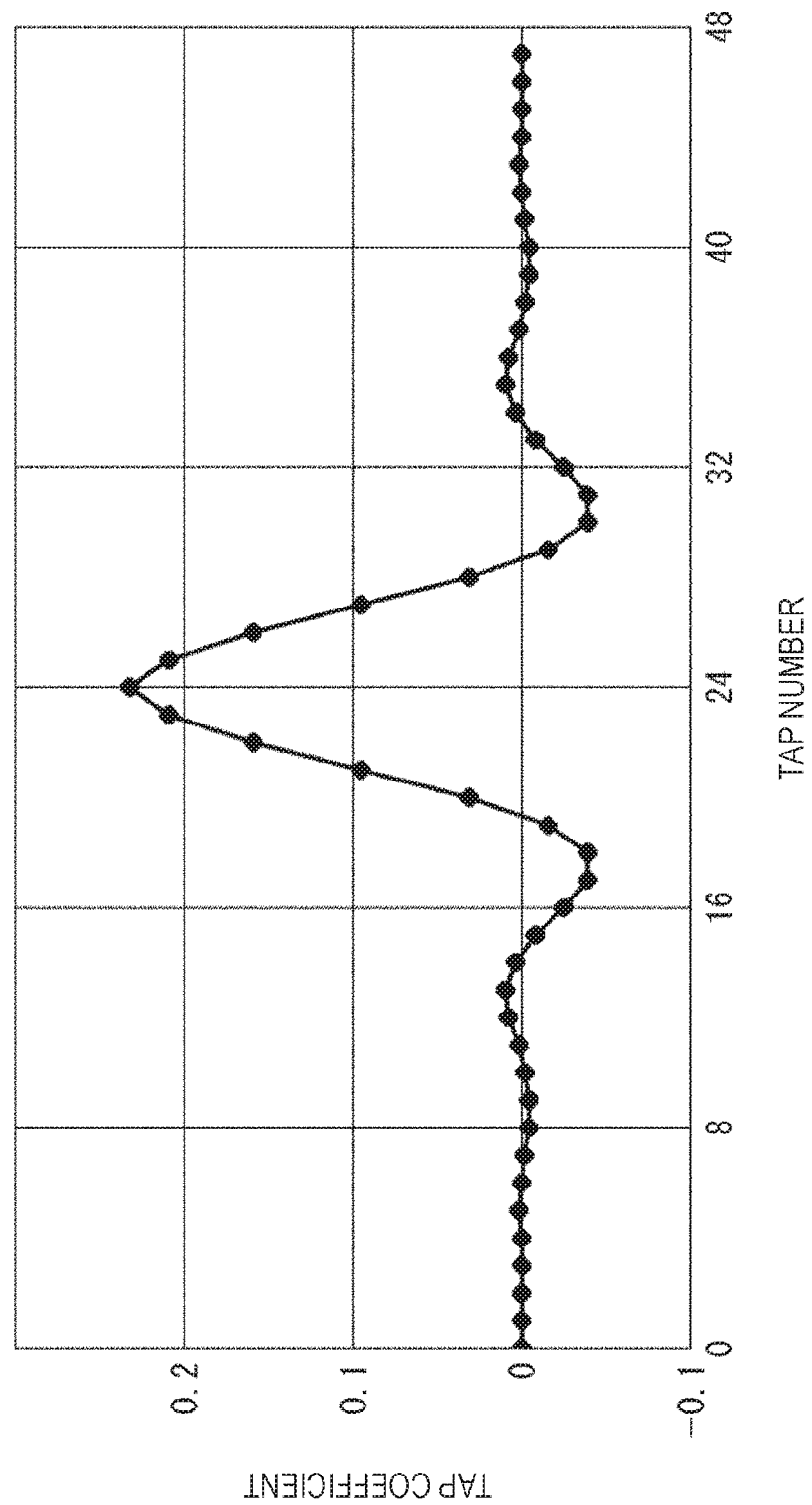
FIG. 12 is a view illustrating an example of the FIR filter.

Furthermore, as another example of the FIR filter realizing the transmission band-limiting filter 103 and the SINC inverse function filter 104, the FIR filter illustrated in FIG. 12 may also be used, for example. It should be noted that, in FIG. 12, the abscissa axis represents the tap number of the tap forming the FIR filter and the ordinate axis represents the tap coefficient.

The FIR filter illustrated in FIG. 12 is the FIR filter with the number of oversamples of eight obtained by combining the raised cosine filter with the corner frequency fc=1.25× fsym/2 and the roll-off factor α1=0.65 and the SINC inverse function filter.

In this case, as for the reception band-limiting filter on the reception side of the band signal, for example, the roll-off factor is α2=0.5 or the like.

Figure 13:
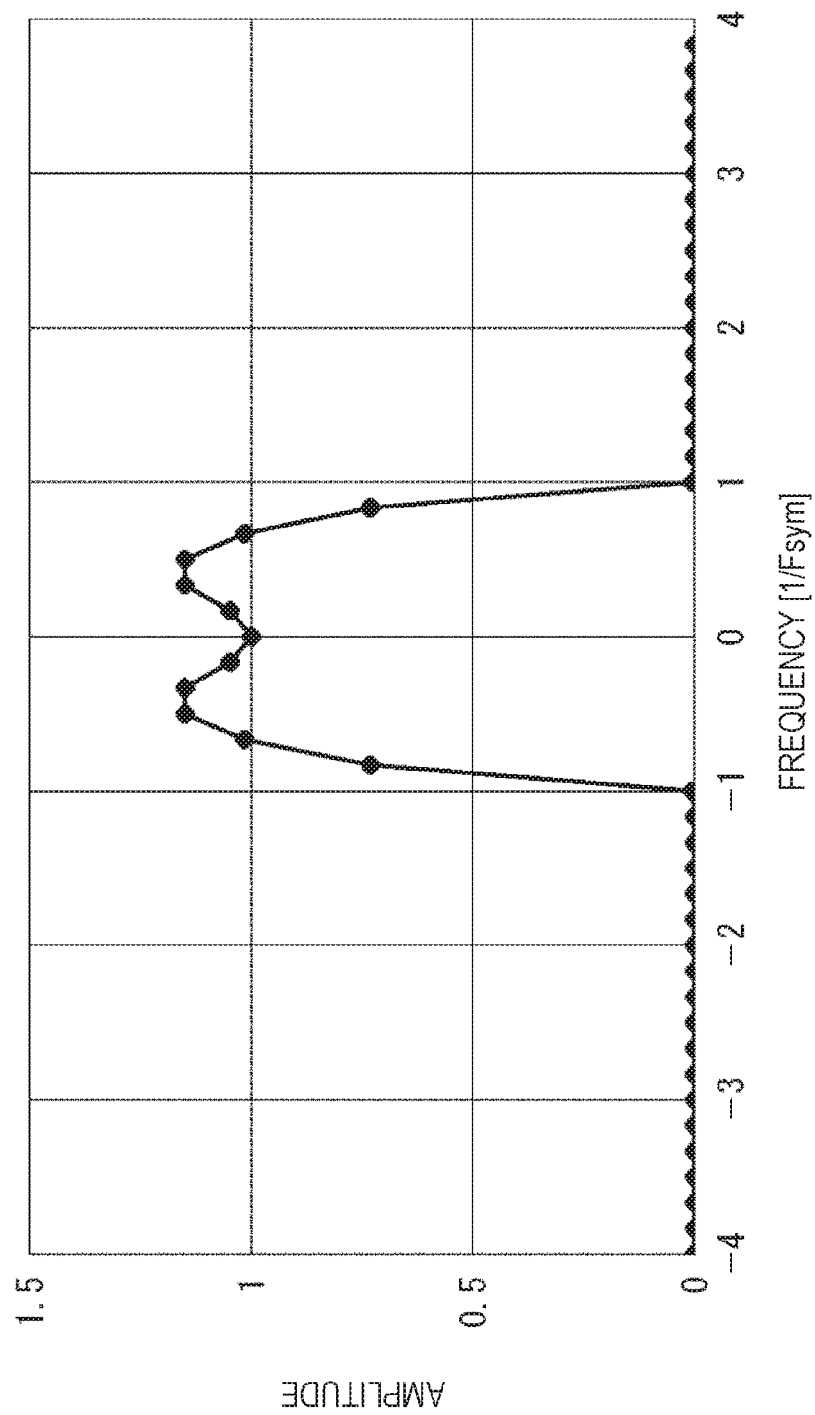
FIG. 13 is a view illustrating the amplitude characteristic of the FIR filter.

The amplitude characteristic of such FIR filter illustrated in FIG. 12 is as illustrated in FIG. 13. It should be noted that, in FIG. 13, the abscissa axis represents the frequency and the ordinate axis represents the amplitude.

According to the experiments by the present applicant, it is confirmed that the signal transmission with less intersymbol interference may be realized also by using the FIR filter having such characteristic.

Figure 14:
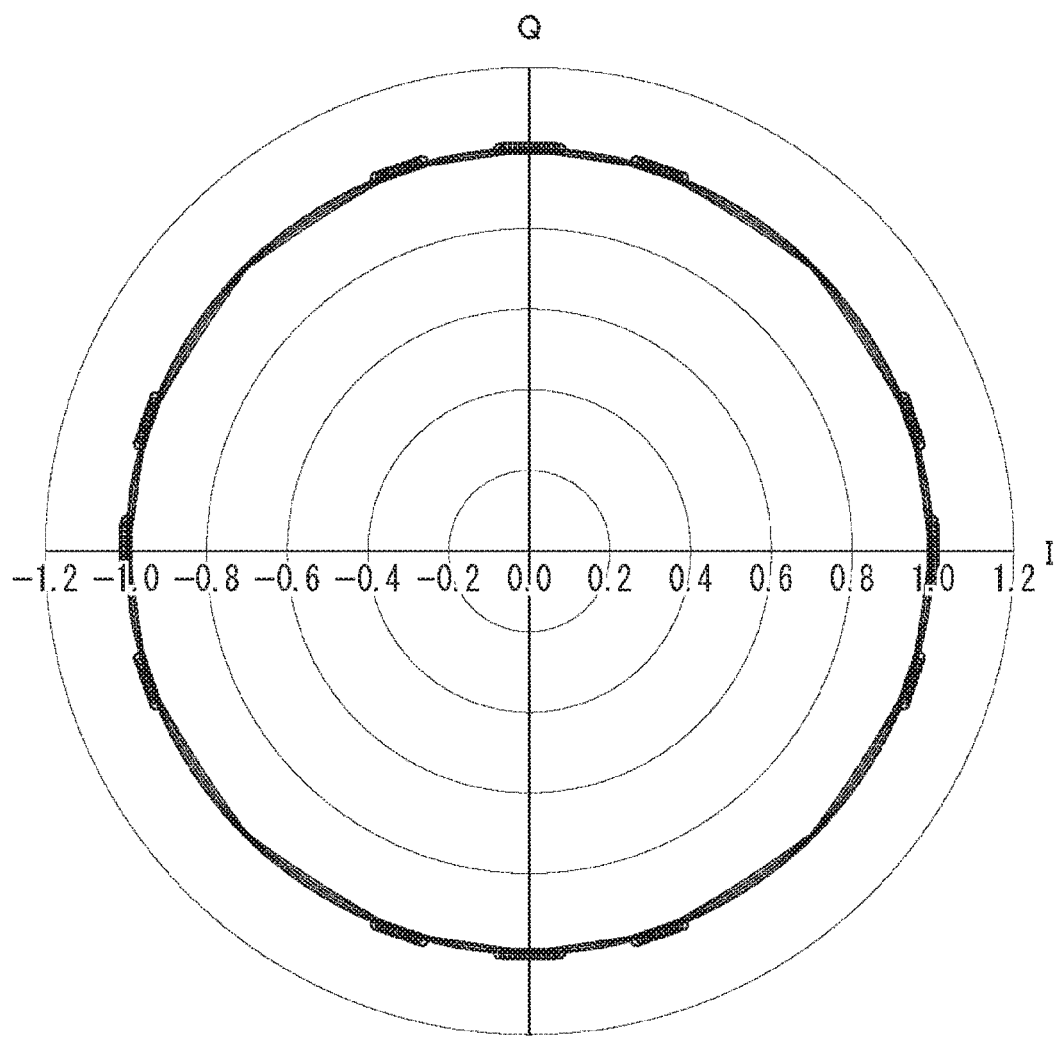
FIG. 14 is a view illustrating a constellation of the band signal.

In addition, in a case where the root-raised cosine filter with the corner frequency fc=1.08×fsym/2 and the roll-off factor α1=0.65 is used as the transmission band-limiting filter 103, the constellation of the band signal is as illustrated in FIG. 14.

It should be noted that, in FIG. 14, the abscissa axis represents the I component and the ordinate axis represents the Q component. Also, circles in FIG. 14 represent the symbol points. In the example of FIG. 14, the radius of the envelope is constant and it may be confirmed that this is the constant envelope.

Figure 15:
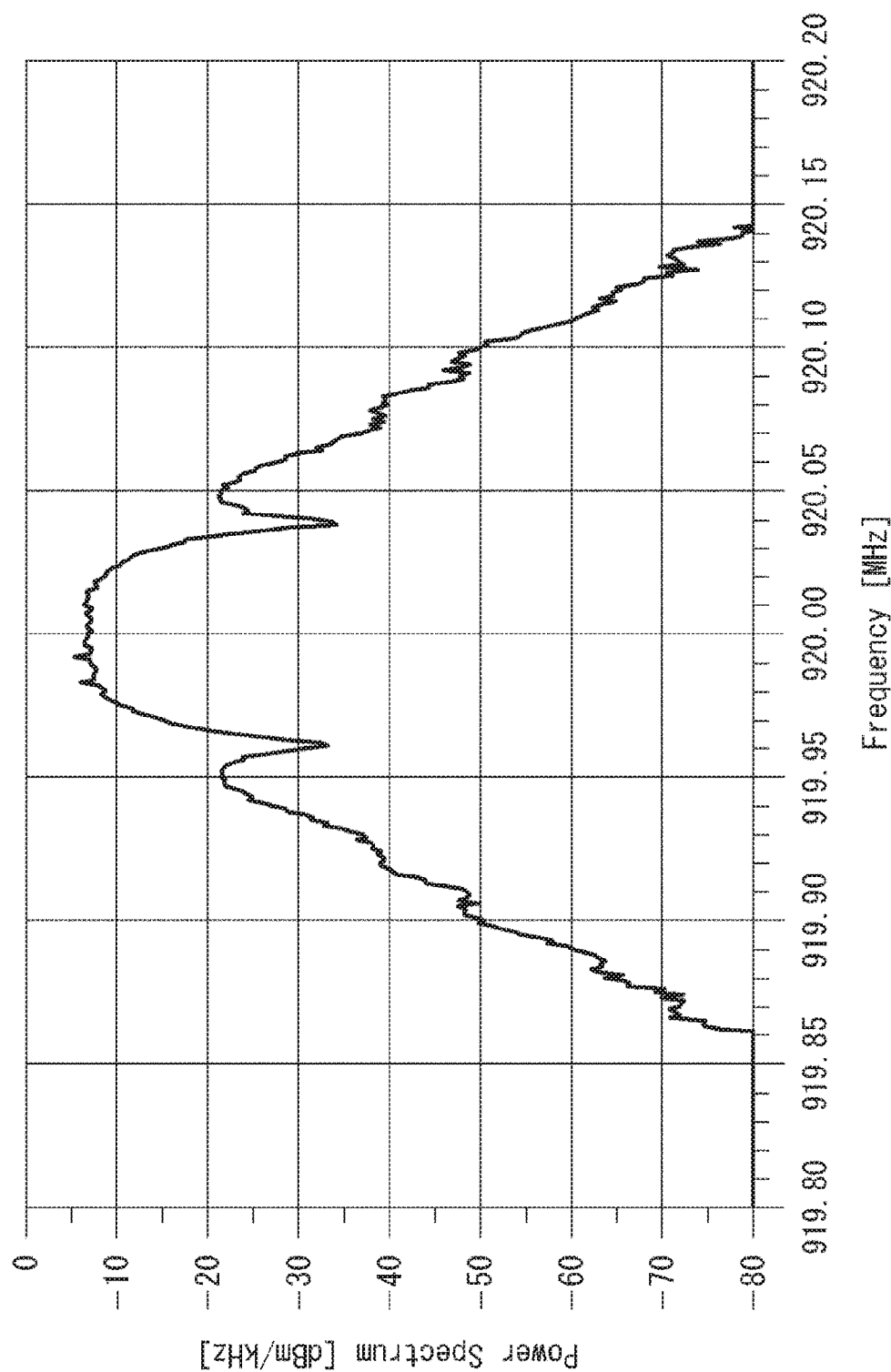
FIG. 15 is a view illustrating a power spectrum of the band signal.

Also, the power spectrum of the band signal of the example illustrated in FIG. 14 is as illustrated in FIG. 15. It should be noted that, in FIG. 15, the abscissa axis represents the frequency and the ordinate axis represents the power spectrum of each frequency.

In the example of FIG. 15, as compared to the example illustrated in FIG. 7 described above, it may be confirmed that the spread of the spectrum is limited. That is, it may be understood that the narrow band frequency characteristic may be realized.

Figure 16:
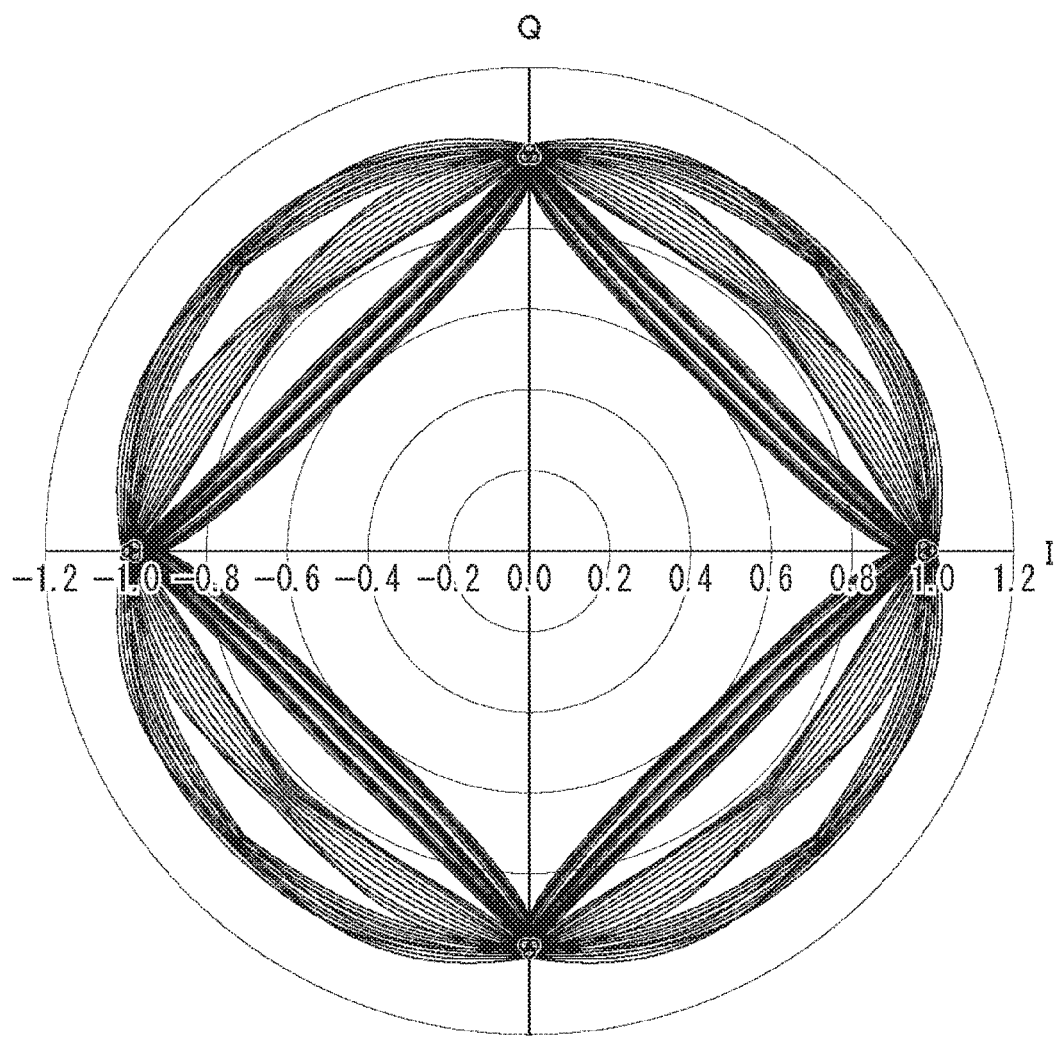
FIG. 16 is a view illustrating a constellation of the baseband signal on the reception side.

Furthermore, in a case where the band signal of the example illustrated in FIG. 14 is received by the reception device 51 illustrated in FIG. 2, the constellation of the baseband signal passing through the reception band-limiting filter 65 is as illustrated in FIG. 16.

It should be noted that, in FIG. 16, the abscissa axis represents the I component and the ordinate axis represents the Q component. Also, circles in FIG. 16 represent the symbol points.

In the example of FIG. 16, it may be confirmed that the spread of the constellation is smaller than that in the example illustrated in FIG. 8. That is, it may be understood that the spread of the symbol points is small. Since the spread of the symbol points may be controlled to be smaller in this manner, it is understood that it is possible to perform highly sensitive reception strong in noise. In other words, it may be understood that the signal transmission with less intersymbol interference may be performed.

Figure 17:
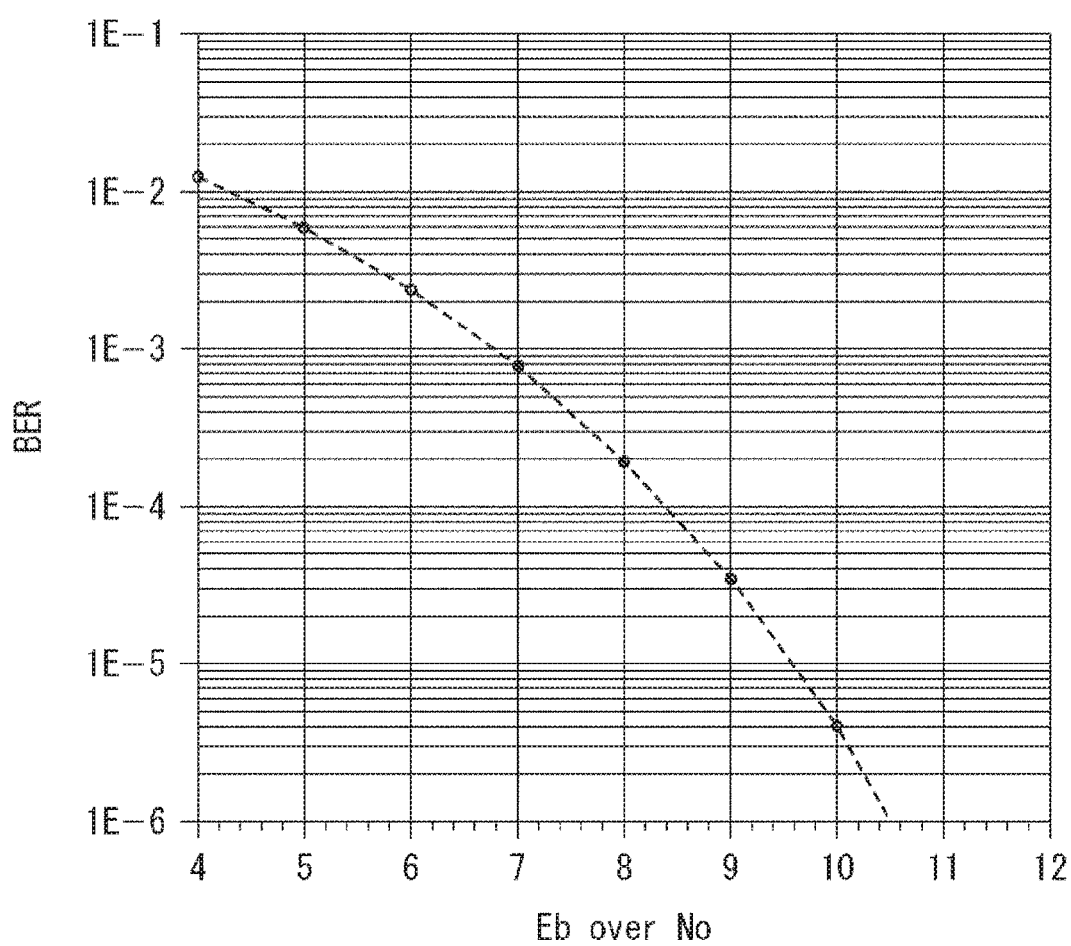
FIG. 17 is a view illustrating a bit error rate characteristic.

That is, when such baseband signal is synchronously detected by the synchronous detector 66 of the reception device 51 illustrated in FIG. 2, a bit error rate (BER) characteristic of a synchronous detection result is as illustrated in FIG. 17. It should be noted that, in FIG. 17, the abscissa axis represents energy per bit, and the ordinate axis represents the bit error rate (BER).

In this example, a dotted line in the drawing indicates the bit error rate characteristic of ideal BPSK, and circles in the drawing indicates the bit error rate characteristic when the above-described baseband signal, that is, the band signal of the example illustrated in FIG. 14 is synchronously detected by the synchronous detector 66.

As is understood from this example, according to the transmission device 91 to which the present technology is applied, the bit error rate characteristic equivalent to the bit error rate characteristic of ideal BPSK may be obtained on the reception side of the band signal. That is, the reception side may receive the band signal with high sensitivity.

As described above, according to the transmission device 91, it is possible to realize the constant envelope digital modulation capable of narrowing the spectral band of the band signal as compared to that in a case where the band signal obtained by π/2 shift BPSK is subjected to saturation amplification even with the constant envelop and receiving the band signal with high sensitivity as in π/2 shift BPSK.

<Description of Transmitting Process>

Figure 18:
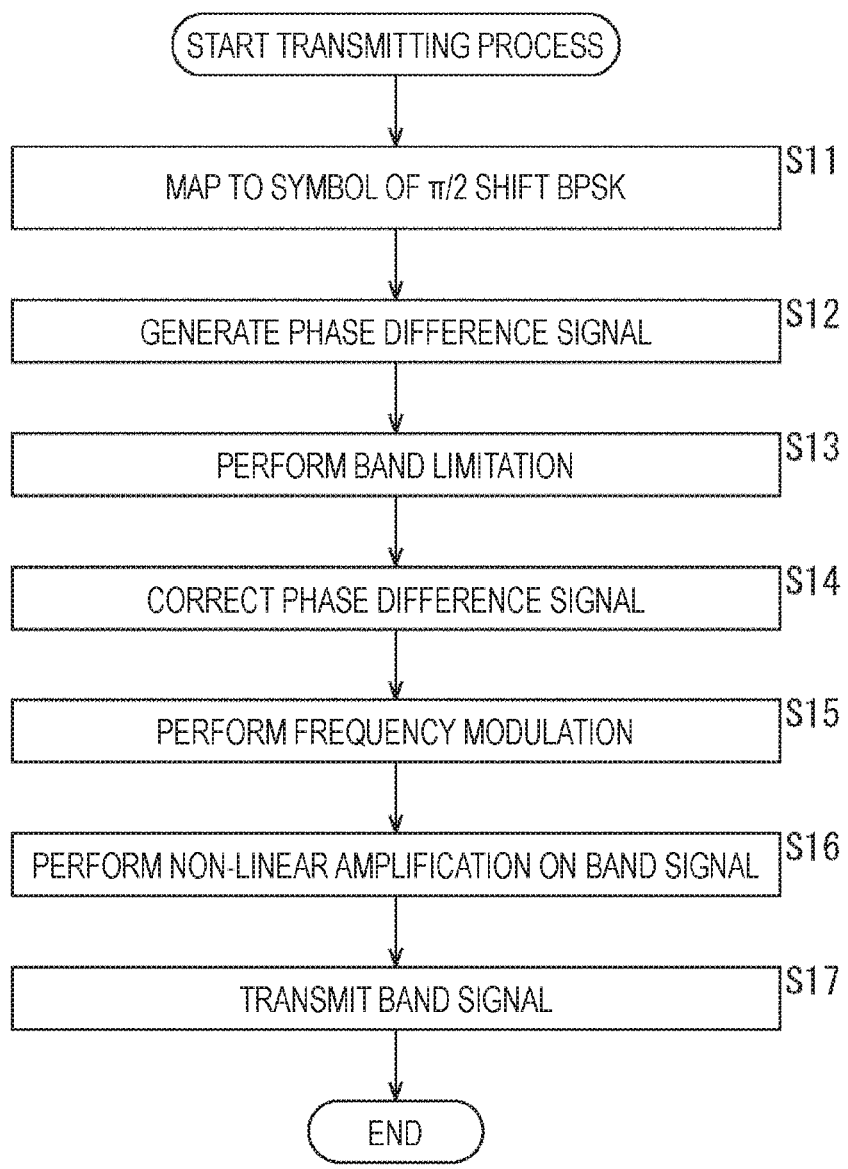
FIG. 18 is a flowchart illustrating a transmitting process.

Next, a transmitting process by the transmission device 91 is described with reference to a flowchart in FIG. 18. This transmitting process starts when the transmission bit string (binary data) of the digital signal to be transmitted is supplied to the mapping unit 101 of the transmission device 91.

At step S11, the mapping unit 101 maps each bit of the supplied transmission bit string to the symbol of π/2 shift BPSK.

Specifically, the mapping unit 101 maps a current transmission bit to any of four symbols of π/2 shift BPSK on the basis of the value of the current transmission bit and the symbol determined for the value of the transmission bit immediately before the transmission bit.

The mapping unit 101 then outputs the mapping value determined for the symbol to which the transmission bit is mapped, that is, the mapping signal indicating a value of the I component and a value of the Q component to the phase differentiator 102 for each transmission bit, that is, for each symbol. As a result, the mapping signal is output from the mapping unit 101 at a predetermined symbol rate.

At step S12, the phase differentiator 102 generates the phase difference signal on the basis of the mapping signal output from the mapping unit 101 and outputs the same to the transmission band-limiting filter 103.

That is, the phase differentiator 102 generates the phase difference signal indicating the phase difference between the symbols corresponding to the mapping signals on the basis of the current mapping signal and the mapping signal temporally immediately before the same for each symbol to which the transmission bit is mapped, that is, for each mapping signal corresponding to the symbol. As a result, the phase difference signal is output from the phase differentiator 102 at a predetermined symbol rate.

At step S13, the transmission band-limiting filter 103 performs the band limitation by filtering the phase difference signal output from the phase differentiator 102 and outputs the band-limited phase difference signal to the SINC inverse function filter 104. Due to such band limitation, only a predetermined band component of the phase difference signal is extracted.

At step S14, the SINC inverse function filter 104 corrects the phase difference signal by filtering the phase difference signal output from the transmission band-limiting filter 103 and outputs the same to the frequency modulator 105. That is, the phase difference signal is corrected such that the Nyquist third criterion is satisfied by the SINC inverse function filter 104.

It should be noted that, as described above, the order of the process at step S13 and the process at step S14 may be reversed, or the processes at steps S13 and S14 may be performed simultaneously by one FIR filter.

At step S15, the frequency modulator 105 controls the voltage controlled oscillator 106 on the basis of the phase difference signal output from the SINC inverse function filter 104 to perform the frequency modulation.

That is, the frequency modulator 105 supplies the phase difference signal to the voltage controlled oscillator 106 and allows the same to apply the frequency modulation with a modulation index h=0.5 to the carrier wave of a predetermined frequency generated by the voltage controlled oscillator 106 and obtains the band signal obtained as a result from the voltage controlled oscillator 106. Then, the frequency modulator 105 outputs the obtained band signal to the saturation amplifier 107. As a result, the band signal having constant amplitude may be obtained.

At step S16, the saturation amplifier 107 performs the non-linear amplification (saturation amplification) on the band signal output from the frequency modulator 105 and outputs the same to the antenna 108.

At step S17, the antenna 108 transmits the band signal output from the saturation amplifier 107 and the transmitting process ends.

In the above-described manner, the transmission device 91 generates the phase difference signal on the basis of the mapping signal, performs the band limitation of the phase difference signal and the correction by the SINC inverse function filter, and performs the frequency modulation based on the phase difference signal.

In this manner, it is possible to realize the narrow band signal to enable the signal transmission with less intersymbol interference, and enable the non-linear amplification on the band signal by generating the band signal having the constant amplitude to improve the power efficiency of the transmission device 91.

As described above, according to the present technology, it is possible to perform the synchronous detection with high sensitivity as in the linear digital modulation method even in the constant envelope digital modulation method, and since the saturation amplifier may be used, the power efficiency of the transmission device may be improved.

Meanwhile, the above-described series of processes may be executed by hardware or by software. In a case where a series of processes is executed by the software, a program which forms the software is installed on a computer. Herein, the computer includes a computer built in dedicated hardware, a general-purpose personal computer, for example, capable of executing various functions by various programs installed and the like.

Figure 19:
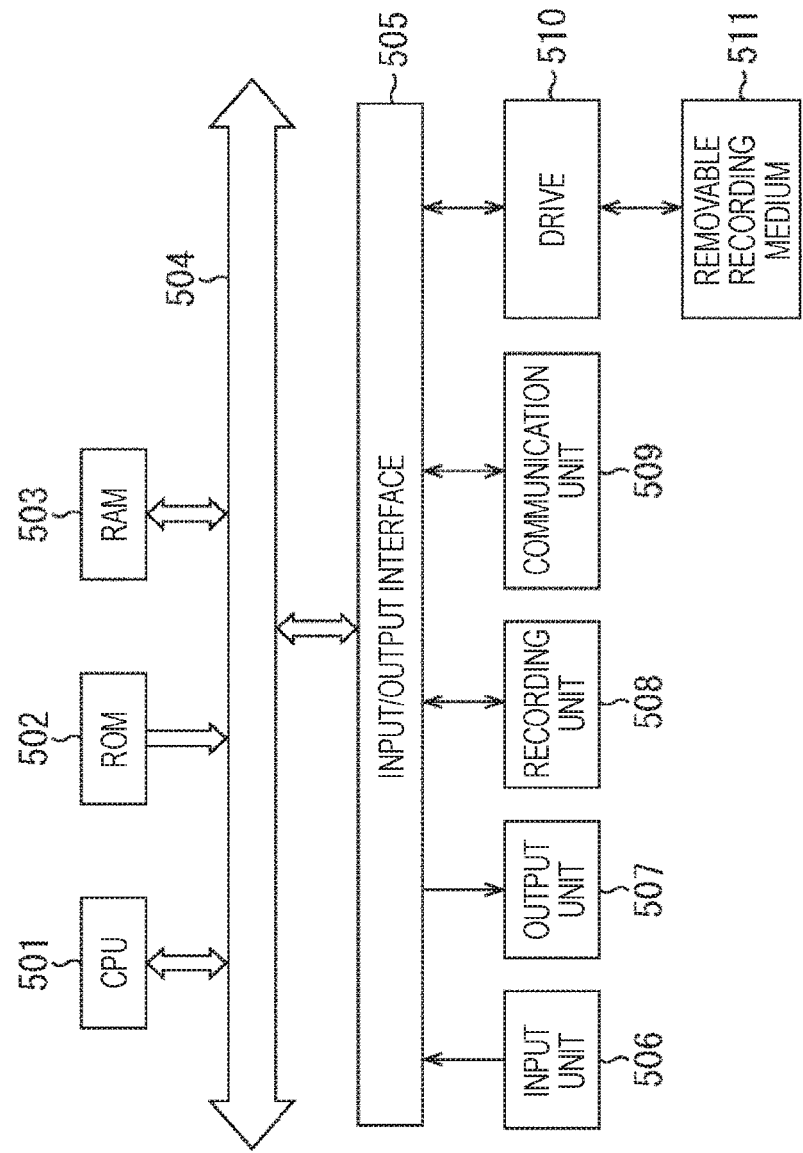
FIG. 19 is a view illustrating a configuration example of a computer.

FIG. 19 is a block diagram illustrating a configuration example of the hardware of the computer which executes the above-described series of processes by the program.

In the computer, a central processing unit (CPU) 501, a read only memory (ROM) 502, and a random access memory (RAM) 503 are connected to one another through a bus 504.

An input/output interface 505 is further connected to the bus 504. An input unit 506, an output unit 507, a recording unit 508, a communication unit 509, and a drive 510 are connected to the input/output interface 505.

The input unit 506 is formed or a keyboard, a mouse, a microphone, an image sensor and the like. The output unit 507 is formed of a display, a speaker, an amplifier, an antenna and the like. The recording unit 508 is formed of a hard disk, a non-volatile memory and the like. The communication unit 509 is formed of a network interface and the like. The drive 510 drives a removable recording medium 511 such as a magnetic disc, an optical disc, a magnetooptical disc, or a semiconductor memory.

In the computer configured in the above-described manner, the CPU 501 loads the program recorded in the recording unit 508, for example, on the RAM 503 through the input/output interface 505 and the bus 504 to execute, and as a result, the above-described series of processes is performed.

The program executed by the computer (CPU 501) may be recorded in the removable recording medium 511 as a package medium and the like to be provided, for example. Also, the program may be provided by means of a wired or wireless transmission medium such as a local area network, the Internet, and digital broadcasting.

In the computer, the program may be installed on the recording unit 508 through the input/output interface 505 by mounting the removable recording medium 511 on the drive 510. Also, the program may be received by the communication unit 509 through the wired or wireless transmission medium to be installed on the recording unit 508. In addition, the program may be installed in advance on the ROM 502 and the recording unit 508.

It should be noted that the program executed by the computer may be the program of which processes are performed in time series in the order described in this description or may be the program of which processes are performed in parallel or at required timing such as when a call is issued.

Also, the embodiment of the present technology is not limited to the above-described embodiment and various modifications may be made without departing from the scope of the present technology.

For example, the present technology may be configured as cloud computing in which a function is shared by a plurality of devices through the network to process together.

Also, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Furthermore, the present technology may also have a following configuration.

(1)

A transmission device including:

a mapping unit that maps binary data to symbols of $\pi/2$ shift BPSK;

a phase differentiating unit that generates a phase difference signal indicating a phase difference between the mapped symbols;

a transmission band-limiting filter with a corner frequency higher than half a frequency of a symbol rate in which a roll-off factor larger than the roll-off factor of a reception band-limiting filter is set, the transmission band-limiting filter that performs band limitation of the phase difference signal;

a SINC inverse function filter that performs correction on the phase difference signal; and a frequency modulating unit that performs frequency modulation on a carrier wave on the basis of the phase difference signal subjected to the band limitation and the correction.

(2)

The transmission device according to (1), in which the SINC inverse function filter performs correction for satisfying a Nyquist third criterion as the correction on the phase difference signal.

(3)

The transmission device according to (1) or (2), in which the frequency modulating unit performs the frequency modulation with a modulation index of 0.5 on the carrier wave.

(4)

The transmission device according to any one of (1) to (3), further including:

a saturation amplifying unit that performs saturation amplification on a band signal obtained by the frequency modulation.

(5)

The transmission device according to any one of (1) to (4), in which the transmission band-limiting filter is a root-raised cosine filter.

(6)

The transmission device according to any one of (1) to (4), in which the transmission band-limiting filter is a raised cosine filter.

(7)

The transmission device according to any one of (1) to (6), in which the SINC inverse function filter performs the correction on the phase difference signal band-limited by the transmission band-limiting filter.

(8)

The transmission device according to any one of (1) to (7), in which the transmission band-limiting filter and the SINC inverse function filter are realized by one FIR filter.

(9)

A transmission method including steps of:

mapping binary data to symbols of $\pi/2$ shift BPSK;

generating a phase difference signal indicating a phase difference between the mapped symbols;

performing band limitation of the phase difference signal by a transmission band-limiting filter with a corner frequency higher than half a frequency of a symbol rate in which a roll-off factor larger than the roll-off factor of a reception band-limiting filter is set;

performing correction on the phase difference signal by a SINC inverse function filter; and performing frequency modulation on a carrier wave on the basis of the phase difference signal subjected to the band limitation and the correction.

(10)

A program that allows a computer to execute a process including steps of:

mapping binary data to symbols of $\pi/2$ shift BPSK;

generating a phase difference signal indicating a phase difference between the mapped symbols;

performing band limitation of the phase difference signal by a transmission band-limiting filter with a corner frequency higher than half a frequency of a symbol rate in which a roll-off factor larger than the roll-off factor of a reception band-limiting filter is set;

performing correction on the phase difference signal by a SINC inverse function filter; and performing frequency modulation on a carrier wave on the basis of the phase difference signal subjected to the band limitation and the correction.

REFERENCE SIGNS LIST

91 Transmission device
101 Mapping unit

102 Phase differentiator
103 Transmission band-limiting filter
104 SINC inverse function filter
105 Frequency modulator
106 Voltage controlled oscillator
107 Saturation amplifier
108 Antenna

The invention claimed is:

1. A transmission device comprising:
an electronic processor configured to
map binary data to symbols, and
generate a signal from the mapped symbols;
a transmission band-limiting filter that performs band limitation of the signal at a corner frequency higher than half a frequency of a symbol rate;
a frequency modulator that performs frequency modulation on a carrier wave on the basis of the band limitation and the signal; and
a SINC inverse function filter that performs a correction on a phase difference signal, band-limited by the transmission band-limiting filter, for satisfying a Nyquist third criterion.

2. The transmission device according to claim 1, wherein the frequency modulator performs the frequency modulation with a modulation index of 0.5 on the carrier wave.

3. The transmission device according to claim 1, further comprising:
a saturation amplifier that performs saturation amplification on a band signal obtained by the frequency modulation.

4. The transmission device according to claim 1, wherein the transmission band-limiting filter is a root-raised cosine filter.

5. The transmission device according to claim 1, wherein the transmission band-limiting filter is a raised cosine filter.

6. A transmission device comprising:
an electronic processor configured to
map binary data to symbols, and
generate a signal from the mapped symbols;
a transmission band-limiting filter that performs band limitation of the signal at a corner frequency higher than half a frequency of a symbol rate; and
a frequency modulator that performs frequency modulation on a carrier wave on the basis of the band limitation and the signal; and
a SINC inverse function filter that performs a correction on a phase difference signal band-limited by the transmission band-limiting filter.

7. A transmission device comprising:
an electronic processor configured to
map binary data to symbols, and
generate a signal from the mapped symbols;
a transmission band-limiting filter that performs band limitation of the signal at a corner frequency higher than half a frequency of a symbol rate; and
a frequency modulator that performs frequency modulation on a carrier wave on the basis of the band limitation and the signal; and
a SINC inverse function filter,
wherein the transmission band-limiting filter and the SINC inverse function filter are realized by one FIR filter.

8. A transmission method comprising:
mapping binary data to symbols of $\pi/2$ shift BPSK;
generating a phase difference signal indicating a phase difference between the mapped symbols;
performing band limitation of the phase difference signal by a transmission band-limiting filter with a corner frequency higher than half a frequency of a symbol rate in which a roll-off factor larger than the roll-off factor of a reception band-limiting filter is set;
performing a correction on the phase difference signal by a SINC inverse function filter; and
performing frequency modulation on a carrier wave on the basis of the phase difference signal subjected to the band limitation and the correction.

9. The transmission method according to claim 8, wherein the SINC inverse function filter performs the correction for satisfying a Nyquist third criterion as the correction on the phase difference signal.

10. The transmission method according to claim 8, wherein a frequency modulator performs the frequency modulation with a modulation index of 0.5 on the carrier wave.

11. The transmission method according to claim 8, further comprising:
performing, with a saturation amplifier, saturation amplification on a band signal obtained by the frequency modulation.

12. The transmission method according to claim 8, wherein the transmission band-limiting filter is a root-raised cosine filter.

13. The transmission method according to claim 8, wherein the transmission band-limiting filter is a raised cosine filter.

14. The transmission method according to claim 8, wherein performing the correction on the phase difference signal by the SINC inverse function filter further includes performing the correction on the phase difference signal that is band-limited by the transmission band-limiting filter.

15. The transmission method according to claim 8, wherein the transmission band-limiting filter and the SINC inverse function filter are realized by one FIR filter.

16. A non-transitory computer-readable medium comprising a program that, when executed by an electronic processor, causes the electronic processor to perform a set of operations, the set of operations comprising:
mapping binary data to symbols of $\pi/2$ shift BPSK;
generating a phase difference signal indicating a phase difference between the mapped symbols;
performing band limitation of the phase difference signal by a transmission band-limiting filter with a corner frequency higher than half a frequency of a symbol rate in which a roll-off factor larger than the roll-off factor of a reception band-limiting filter is set;
performing a correction on the phase difference signal by a SINC inverse function filter; and
performing frequency modulation on a carrier wave on the basis of the phase difference signal subjected to the band limitation and the correction.

17. The non-transitory computer-readable medium according to claim 16,
wherein the SINC inverse function filter performs the correction for satisfying a Nyquist third criterion as the correction on the phase difference signal.

18. The non-transitory computer-readable medium according to claim 16, further comprising:
   performing saturation amplification on a band signal by a saturation amplifier, the band signal obtained by the frequency modulation.

19. The non-transitory computer-readable medium according to claim 16,
   wherein performing the correction on the phase difference signal by the SINC inverse function filter further includes performing the correction on the phase difference signal that is band-limited by the transmission band-limiting filter.

20. The non-transitory computer-readable medium according to claim 16,
   wherein the transmission band-limiting filter and the SINC inverse function filter are realized by one FIR filter.

* * * * *